US006993658B1

(12) United States Patent
Engberg et al.

(10) Patent No.: US 6,993,658 B1
(45) Date of Patent: Jan. 31, 2006

(54) USE OF PERSONAL COMMUNICATION DEVICES FOR USER AUTHENTICATION

(75) Inventors: Sten-Olov Engberg, Storvreta (SE); Ake Jonsson, Fagersta (SE)

(73) Assignee: April System Design AB, Solna (SE)

( * ) Notice: Subject to any disclaimer, the term of this patent is extended or adjusted under 35 U.S.C. 154(b) by 0 days.

(21) Appl. No.: 09/519,829

(22) Filed: Mar. 6, 2000

(51) Int. Cl.
G07F 7/10 (2006.01)
H04L 9/32 (2006.01)
H04L 12/14 (2006.01)
H04M 15/00 (2006.01)

(52) U.S. Cl. .................. 713/185; 379/114.2; 709/219; 713/183; 713/201; 713/202

(58) Field of Classification Search ............... 380/247, 380/249; 455/411; 713/202, 182, 183, 185; 705/74; 235/382.5; 379/114.2; 709/219
See application file for complete search history.

(56) References Cited

U.S. PATENT DOCUMENTS

| | | | | |
|---|---|---|---|---|
| 5,153,919 A | * | 10/1992 | Reeds et al. | 380/44 |
| 5,265,155 A | * | 11/1993 | Castro | 379/114.2 |
| 5,323,146 A | * | 6/1994 | Glaschick | 713/202 |
| 5,497,411 A | * | 3/1996 | Pellerin | 455/411 |
| 5,590,198 A | | 12/1996 | Lee et al. | |
| 5,749,075 A | * | 5/1998 | Toader et al. | 705/14 |
| 5,875,394 A | * | 2/1999 | Daly et al. | 455/411 |
| 5,923,763 A | | 7/1999 | Walker et al. | |
| 5,949,882 A | * | 9/1999 | Angelo | 713/185 |
| 5,956,633 A | * | 9/1999 | Janhila | 455/410 |
| 6,049,877 A | | 4/2000 | White | |
| 6,075,860 A | * | 6/2000 | Ketcham | 713/185 |
| 6,078,908 A | | 6/2000 | Schmitz | 705/50 |
| 6,161,182 A | | 12/2000 | Nadooshan | |
| 6,173,400 B1 | | 1/2001 | Perlman et al. | |
| 6,226,364 B1 | * | 5/2001 | O'Neil | 379/114.2 |
| 6,795,852 B1 | * | 9/2004 | Kleinrock et al. | 709/220 |

FOREIGN PATENT DOCUMENTS

AU A-63545/98 5/1998

(Continued)

OTHER PUBLICATIONS

Menezes, "Handbook of Applied Cryptography," 1997, p. 390.*

(Continued)

Primary Examiner—Gilberto Barrón, Jr.
Assistant Examiner—Matthew Heneghan
(74) Attorney, Agent, or Firm—Knobbe, Martens, Olson & Bear LLP

(57) ABSTRACT

A password setting system for a secure system includes a user token server and a communication module. The user token server generates a random token in response to a request for a new password from a user. The server creates a new password by concatenating a secret passcode that is known to the user with the token. The server sets the password associated with the user's user ID to be the new password. The communication module transmits the token to a personal communication device, such as a mobile phone or a pager carried by the user. The user concatenates the secret passcode with the received token in order to form a valid password, which the user submits to gain access to the secure system. Accordingly, access to the system is based upon: nonsecret information known to the user, such as the user ID; secret information known to the user, such as the passcode; and information provided to the user through an object possessed by the user, such as the token.

7 Claims, 11 Drawing Sheets

FOREIGN PATENT DOCUMENTS

| | | | |
|---|---|---|---|
| AU | 9863545 A | * | 11/1998 |
| EP | 0 875 871 A2 | | 11/1998 |

OTHER PUBLICATIONS

*Security Dynamics-SecurID Tokens Datasheet*, http://www.computerterps.com/internet/security/secdyn/tokens.html., last modified Jul. 31, 1998.

*ACE/Server*, http://www.computerps.com/internet/security/secdyn/aceserv.html, last modified Jul. 15, 1998.

*RSA Security Inc.-RSA SecurID Two-Factor Authenication System*, http://www.securid.com/products/securid/index.html., printed on Mar. 3, 2000.

24-hour cellphone cyberwatch—Internet—printed on May 19, 2000.

Monkey as authentication software—Internet—2 pages, printed on May 19, 2000.

Monkey (mobile network key)—Internet—6 pages, printed on May 19, 2000.

International Search Report for PCT/US01/07058 (3-pages).

* cited by examiner

Logon To Network:

USER ID ⎕

PASSWORD ⎕

Note: Your password is your passcode followed by a valid token

*FIG. 2A*

Logon To Network:

USER ID ⎕

PASSCODE ⎕

TOKEN ⎕

*FIG. 2B*

Please enter a user ID to request a Token
Token will be instantly transmitted to your registered Personal Communication Device and will be valid for one minute

USER ID ⎕

*FIG. 2C*

Logon To Network:

PASSCODE ⎕

TOKEN ⎕

*FIG. 2D*

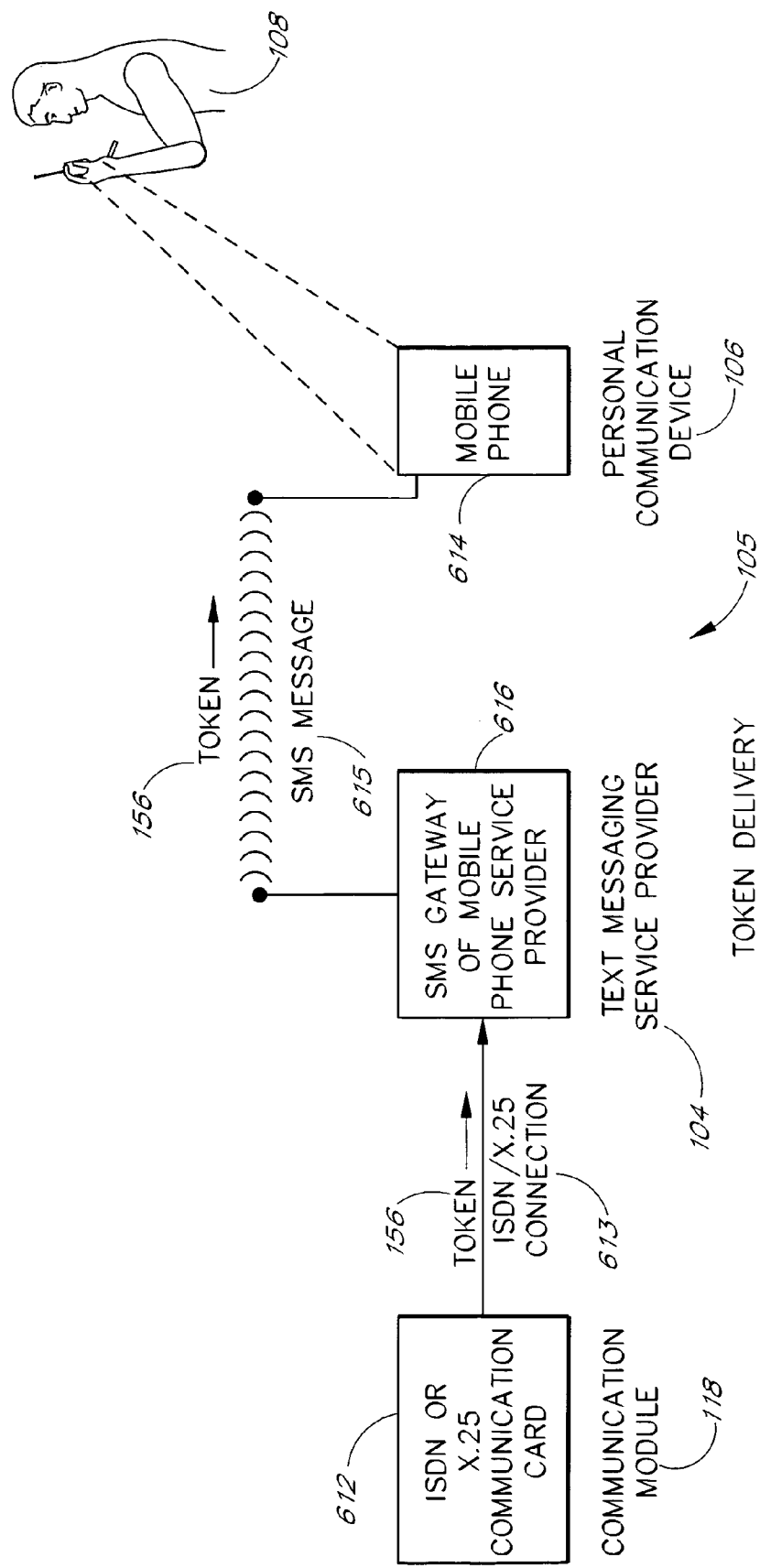

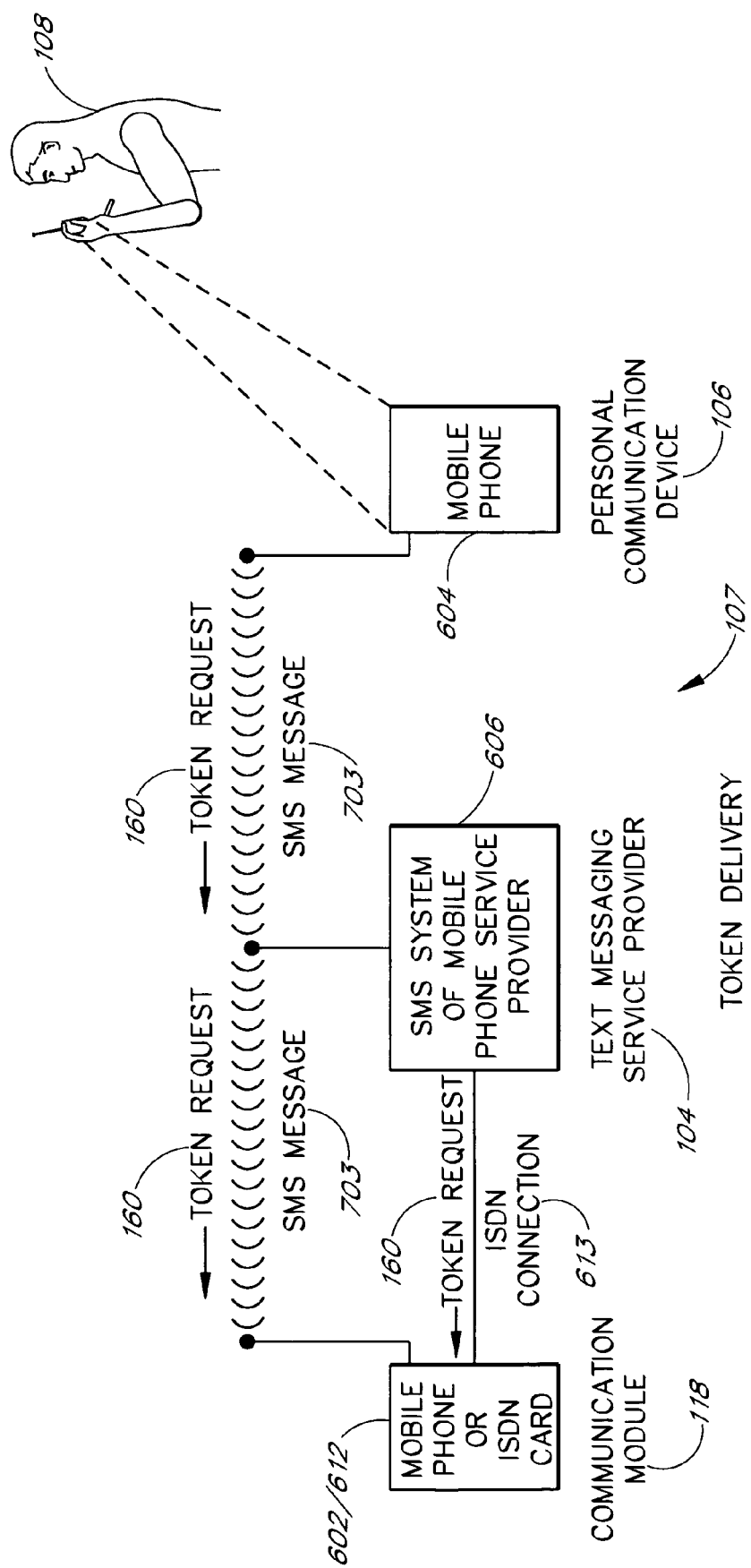

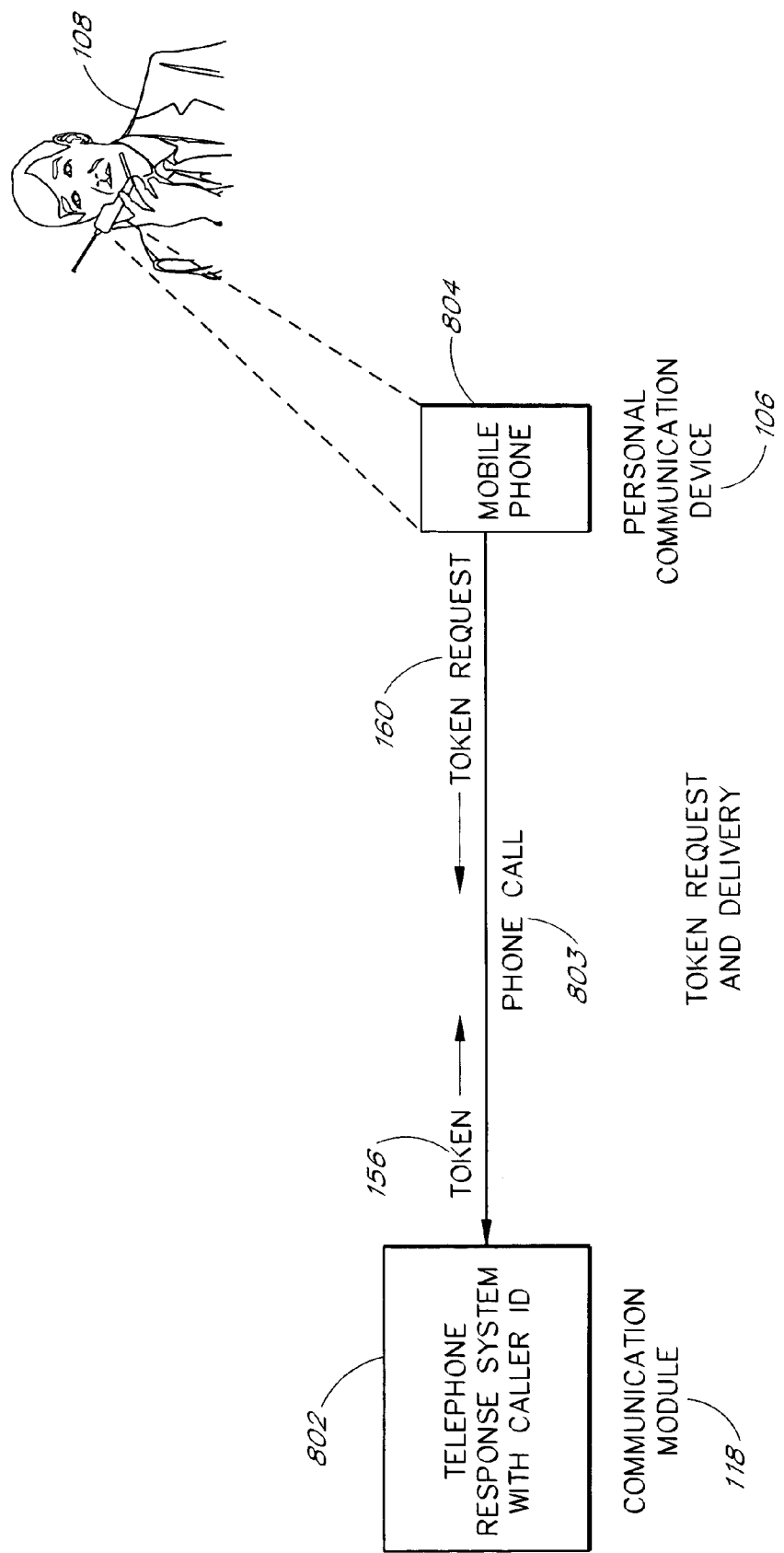

USE OF PERSONAL COMMUNICATION DEVICES FOR USER AUTHENTICATION

BACKGROUND OF THE INVENTION

1. Field of the Invention

This invention relates generally to the authentication of users of secure systems and, more particularly, the invention relates to a system through which user tokens required for user authentication are supplied through personal communication devices such as mobile telephones and pagers.

2. Description of the Related Art

Secure systems have traditionally utilized a user ID and password pair to identify and authenticate system users. Operating systems that control local area networks of workstations within a business or institution such as Novell NetWare, Microsoft NT, Windows 2000, and UNIX/Linux typically require submission of a user ID and password combination before allowing access to a workstation.

The incorporation of remote connectivity to secure systems over the Internet has weakened traditional controls imposed by a user's required physical presence within a company's premises and has exposed systems to additional security threats. External users accessing by dial-in or over the Internet, complicated by frequent personnel turnover, require frequent changes in password lists.

Passwords created by users are often combinations of words and names, which are easy to remember but also easily guessed. Guessing passwords is a frequent technique used by "hackers" to break into systems. Therefore, many systems impose regulations on password formats that require mixtures of letters of different cases and symbols and that no part of a password be a word in the dictionary. A user's inability to remember complex combinations of letters, numbers, and symbols often results in the password being written down, sometimes on a note stuck to the side of a workstation.

Present systems face several problems: users dread frequent password changes, frequent password changes with hard-to-remember passwords inevitably result in users surreptitiously writing down passwords, and security is compromised when users write down their passwords.

The SecurID product, which is distributed by RSA Security Inc., solves many of the aforementioned problems by requiring a two-factor authentication process. The first factor is a user passcode or personal identification number. The second factor is a SecurID card that is possessed by the user. The SecurID card generates and displays unpredictable, one-time-only access codes that automatically change every 60 seconds. The user supplies the displayed code upon logging into a system. The system has a corresponding code generator that allows verification of possession of the card.

The SecurID product, however, requires users to carry an additional item on their person in order to access a secure system. It would be advantageous if the benefits of the SecurID system could be achieved using a device that many users already carry—a personal communication device such as a mobile phone or a pager.

SUMMARY OF THE INVENTION

A preferred embodiment of the present invention is a password setting system for setting user passwords for a secure system, such as a computer system or a secure area of a building. The password setting system preferably includes a user token server and a communication module. The user token server generates a random token in response to a request for a new password from a user. The server creates a new password by concatenating a secret passcode that is known to the user with the token. The server sets the password associated with the user's user ID to be the new password. The communication module transmits the token to a personal communication device, such as a mobile phone or a pager carried by the user. The user concatenates the secret passcode with the received token in order to form a valid password, which the user submits to gain access to the secure system. Accordingly, access to the system is based upon: nonsecret information known to the user, such as the user ID; secret information known to the user, such as the passcode; and information provided to the user through an object possessed by the user, such as the token.

One aspect of the invention is a method for setting passwords. The method includes associating a user ID with a phone number of a personal communication device. The method also includes generating a new password based at least upon a token. The method also includes setting a password associated with the user ID to be the new password. The method also includes transmitting the token to the personal communication device using the phone number associated with the user ID. In another aspect, the method also includes associating the user ID with a passcode. In another aspect, the new password is generated based additionally upon the passcode. In another aspect, the method also includes receiving a request for the user token. In another aspect, the personal communication device is a mobile phone. In another aspect, the personal communication device is a pager.

An additional aspect of the invention is a password setting system. The system includes a first user database configured to associate a user ID with a phone number of a personal communication device. The system also includes a control module configured to create a password based at least upon a token. The control module is further configured to cause a second user database to associate the password with the user ID. The system also includes a communication module interface configured to cause a communication module to transmit the token to the personal communication device using the phone number associated with the user ID. In another aspect, the first user database and the second user database are the same database. In another aspect, the first user database is further configured to associate the user ID with a passcode, and the control module is further configured to create the password based additionally upon the passcode.

An additional aspect of the invention is a method of regulating access to a secure system. The method includes transmitting a user token to a personal communication device. The method also includes receiving login data in response to a request for authentication information, wherein the login data is based at least upon the user token. The method also includes granting access to the secure system based upon the received login data. In another aspect, the login data is additionally based upon a user ID. In another aspect, the login data comprises a user ID. In another aspect, the login data is additionally based upon a passcode. In another aspect, the login data comprises a user ID and a password. In another aspect, the password comprises a passcode and the token. In another aspect, the password is a concatenation of the passcode and the token. In another aspect, the password is a hashed concatenation of the passcode and the token. In another aspect the method also includes generating the user token. In another aspect the method also includes receiving a request for the user token.

In another aspect, the personal communication device is a mobile phone. In another aspect, the personal communication device is a pager.

An additional aspect of the invention is an access control system. The system includes a user token server configured to transmit a token to a personal communication device. The user token server is further configured to generate a valid password based at least upon the token. The system also includes an authentication module configured to receive at least a submitted password in response to a request for authentication of a user. The authentication module is further configured to grant access to the user if at least the submitted password is based at least upon the token and matches the valid password. In another aspect, the user token server is further configured to generate the valid password based additionally upon a valid passcode that is known to the user. In another aspect, the user token server is further configured to transmit the token in response to a request by the user. In another aspect, the user token server is further configured to associate the valid password with a valid user ID, the authentication module is further configured to receive a submitted user ID in response to the request for authentication, and the authentication module is further configured to grant access to the user if, in addition, the submitted user ID matches the valid user ID.

BRIEF DESCRIPTION OF THE DRAWINGS

The present invention will be described below in connection with the attached drawings in which:

FIGS. 2A–D illustrate login screens that can be used in conjunction with various embodiments of the invention;

FIGS. 6A–C illustrate three embodiments of a token delivery communication link;

FIGS. 7A–B illustrate two embodiments of a token request communication link; and FIG. 8 illustrates an embodiment of a combined token request and delivery communication link.

DETAILED DESCRIPTION OF THE EMBODIMENTS

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices and methods to those described herein. In other instances, well-known methods and devices have not been described in detail so as not to unnecessarily obscure aspects of the present invention.

I. Overview and System Components

Figure 1:
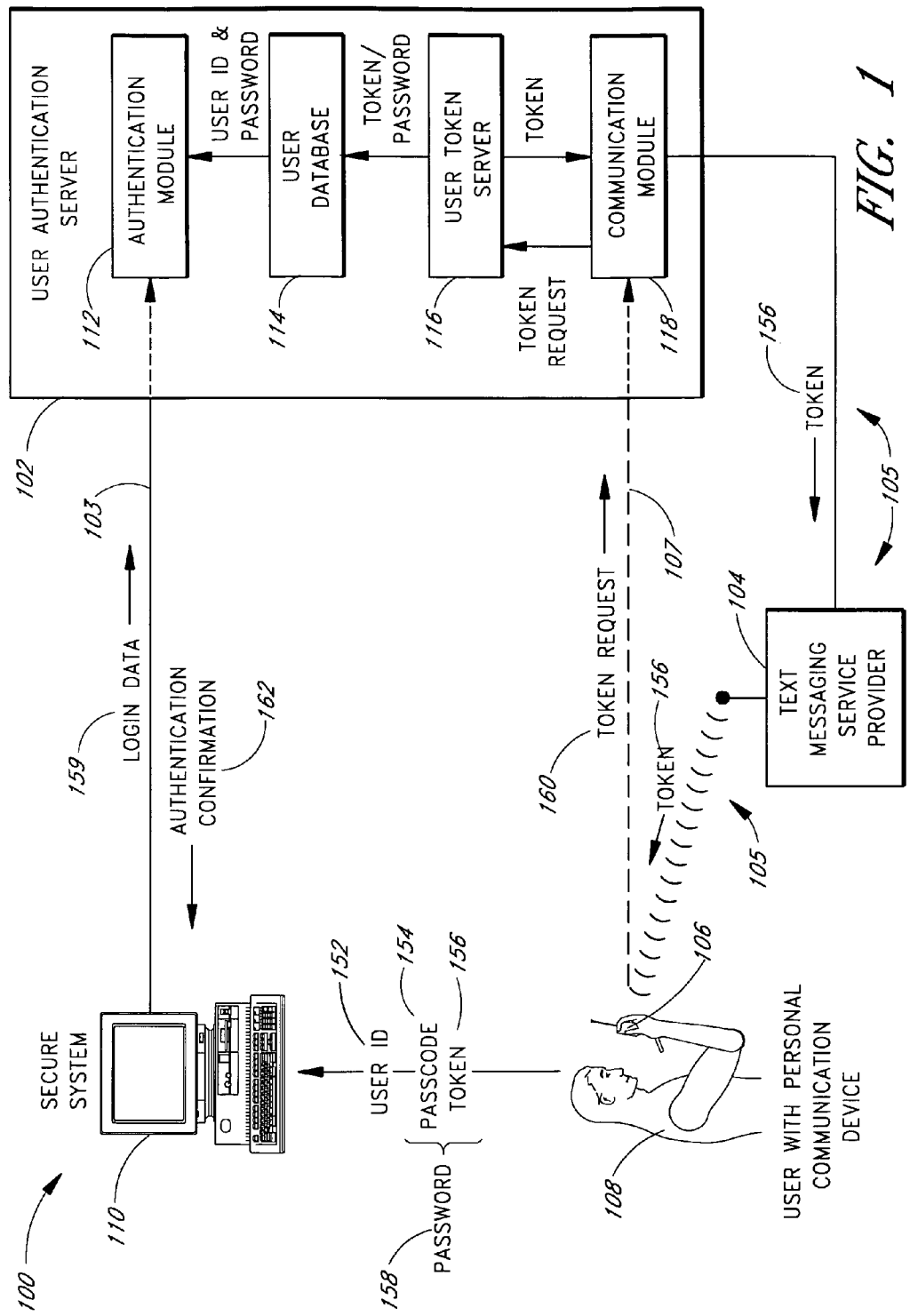
FIG. 1 illustrates an overview, including system components, of a user authentication system according to a preferred embodiment of the present invention.

FIG. 1 illustrates an overview, including system components, of a user authentication system 100 according to a preferred embodiment of the present invention. FIG. 2A illustrates a login screen that can be used in accordance with the preferred embodiment. FIGS. 2B–D illustrate login screens that can be used in accordance with alternative embodiments.

The user authentication system 100 includes an authentication server 102, a text messaging service provider 104, a personal communication device 106 carried by a user 108, and a secure system 110 to which the authentication system 100 regulates access. The personal communication device 106 is preferably a pager or a mobile phone having SMS (short message service) receive capability. SMS is a secure text messaging capability that is incorporated into most digital mobile phones. The secure system 110 is preferably a Windows NT computer workstation, but may be any system, device, account, or area to which it is desired to limit access to authenticated users. The secure system 110 may be, for example, a user account on a network of computer workstations, a user account on a web site, or a secure area of a building. The secure system 110 is preferably connected to the user authentication server 102 by a computer network 103. In one embodiment, the user authentication server 102 is integrated into the secure system 110.

The user authentication server 102 preferably includes a program or a suite of programs running on a computer system to perform user authentication services. The user authentication server 102 may also include the computer system and hardware upon which the programs run. The user authentication server 102 is preferably configured to require that the user 108 supply authentication information through the secure system 110 in order to gain access to the secure system 110.

The authentication information preferably includes a user ID 152, a passcode 154 and a user token 156. The user 108 preferably commits to memory the user ID 152 and passcode 154. The user ID 152 may be publicly known and used to identify the user 108. The passcode 154 is preferably secret and only known to the user 108. The token 156 is preferably provided only to the user 108 by the user authentication server 102 through the user's personal communication device 106 on an as needed basis. The token 156 preferably has a limited lifespan, such as 1 minute or 1 day. Accordingly, the user 108 needs to be in possession of his personal communication device 106 in order to gain access to the secure system 110. Therefore, if the user's user ID 152 and passcode 154 are compromised, a malicious party still cannot access the secure system without possession of the personal communication device 106.

In the preferred embodiment, the user 108 combines the token 156 with the passcode 154 to form a password 158. For example, the user 108 can combine a valid, memorized passcode of "abcd" with a valid token of "1234" to form a valid password of "abcd1234." In this manner, a login screen such as is illustrated in FIG. 2A, which is similar or identical to standard login screens that require a user ID 152 and a password 158, can be used. In an alternative embodiment, the passcode 154 and the token 156 are submitted separately, as is illustrated in FIG. 2B. In another embodiment, the passcode 154 is null in which case the token 156 alone is used as the password 158. In still another embodiment, the token 156 can be requested through the secure system 110 as is illustrated in FIGS. 2C–D.

The user authentication server 102 is preferably a secure system itself and may be a part or component of the secure system 110. The user authentication server 102 preferably includes an authentication module 112 and a user database 114. The authentication module 112 is preferably identical to the code or software provided with operating systems such as Windows NT that authenticates users upon login. In alternative embodiments, the authentication module 112 may be any code, device, or module capable of authenticating a user based upon a supplied user ID 152 supplemented by a supplied password 158 or a passcode 154 and a token 156 combination. The authentication module 112 preferably responds to an authentication request transmitted over the computer network 103 by supplying an authentication confirmation 162 over the network 103. If the user 108 has been authenticated, the confirmation 162 instructs the secure system 110 to allow access to the user 108. The user database 114 is preferably similar or identical to the database accessed by the authentication module 112 that stores user ID and password data (or passcode and token data) in operating systems such as Windows NT. In alternative embodiments, the user database 114 can be any database capable of storing user ID and password data.

The user authentication server 102 preferably also includes a user token server 116 that responds to requests for tokens 160 by generating a token 156 and transmitting the token 156 to the user's personal communication device 106. The user authentication server 102 preferably also resets passwords in the user database 114 based upon generated tokens and passcode data. The user authentication server 102 preferably transmits the tokens 156 over a token delivery communication link 105 to the user's personal communication device 106.

The user authentication server 102 preferably also includes a communication module 118, which is also part of the token delivery communication link 105. The communication module 118 forwards tokens 156 to a text messaging service provider 104, which may be a pager or mobile phone service provider. The text messaging service provider 104 then forwards the token 156 preferably in the form of a secure text message to the personal communication device 106.

In the preferred embodiment, the communication module 118 is a mobile phone with SMS text messaging send capability. One applicable mobile phone is the presently available Ericsson T-28. The mobile phone 118 is preferably connected to the user authentication server 102 via a presently available serial port cable that makes the phone accessible in a manner similar to a computer modem. Accordingly, the user authentication server 102 can send tokens 156 via the server's mobile phone 118 to the user's mobile phone 106 using SMS. In this case, the server's mobile phone 118 transmits a message including the token 156 to the user's personal communication device 106 using the phone number of the user's personal communication device 106. During the transmission, the message is relayed by the mobile phone service provider 104 to its final destination.

Preferably, the communication module 118 is also configured to receive requests for tokens 160. The user preferably transmits a request for tokens 160 over a request communication link 107. The request communication link 107 may be the same communication link as the delivery communication link 105 or it may be a different link. Various embodiments of the token delivery communication link 105 and the token request communication link 107 will be discussed in Section III below.

In the preferred embodiment, the communication module 118 is a mobile phone that also has SMS text messaging receive capability. The communication module 118 receives an SMS message from the user's mobile SMS send enabled mobile phone 106, and the token server 116 preferably processes the message as a token request 160. The incoming SMS message is tagged with the sending phone's phone number, which the user token server 116 can use to identify the requesting user and respond with a new token 156. The token request 160 may also be in the form of a phone call, in which case the user token server 116 may use a caller ID feature to identify the calling phone number as a valid user's personal communication device 106. The user token server 116 can then respond with a new token 156. Alternatively, the user token server 116 may allow a calling user 108 to enter the phone number of his personal communication device 106 using the mobile phone keypad once a connection has been established.

In an alternative embodiment, the communication module 118 is an ISDN card that is connected to the text messaging service provider 104 preferably via an X.25 connection. The ISDN card 118 preferably transmits new tokens directly to the text messaging service provider 104 for forwarding to the user's personal communication device 106. The ISDN card 118 may also be configured to be accessible at a phone number to receive calls for requests for tokens 160.

Figure 3:
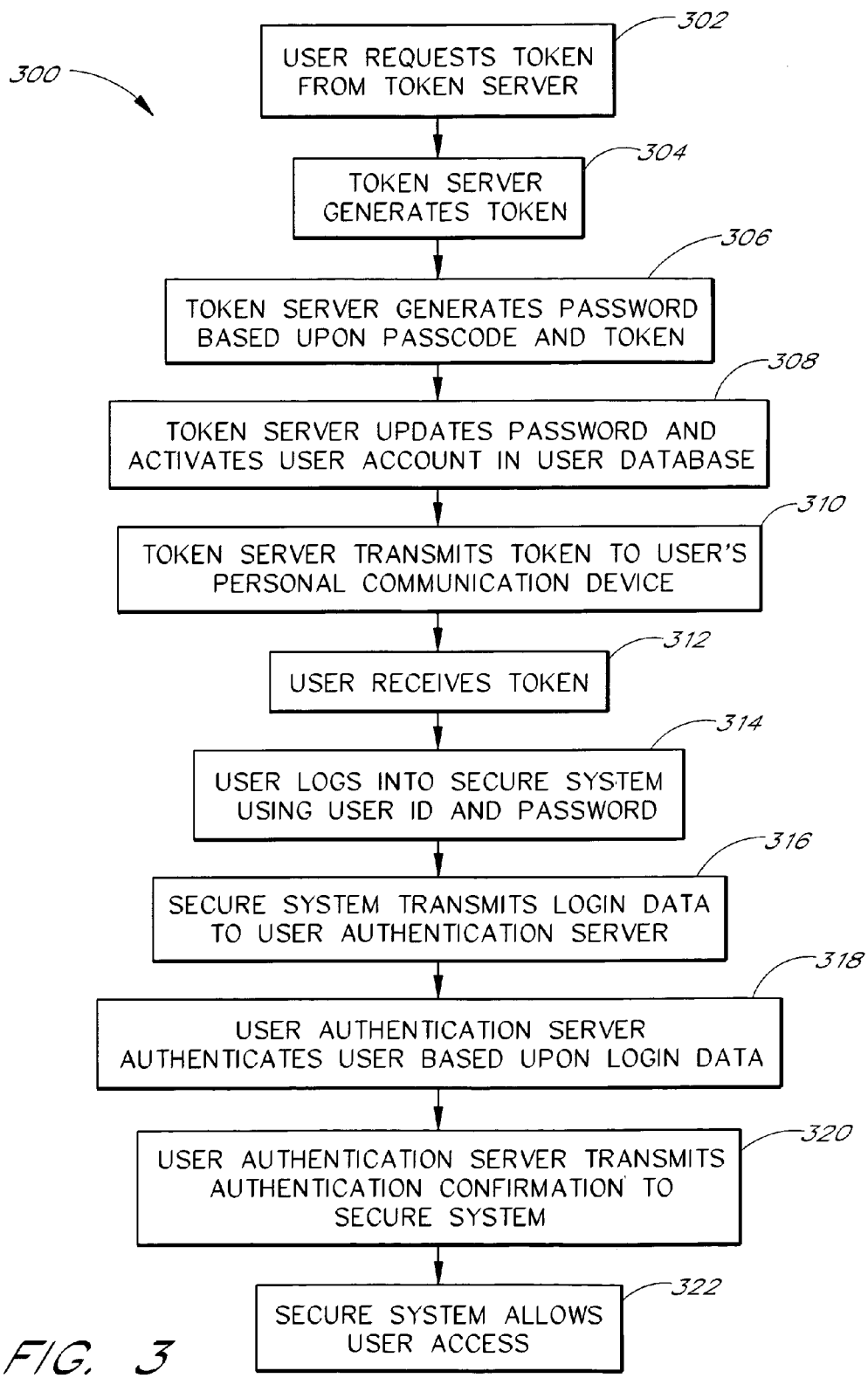
FIG. 3 illustrates a preferred process performed by the system to authenticate users.

FIG. 3 illustrates a preferred process 300 performed by the system 100 to authenticate users. At a step 302, the user 108 requests a token from the user token server 116 through the token request communication link 107. In the preferred embodiment, the user's mobile phone 106 has SMS send capability and the user sends an SMS message to the communication module 118 requesting a new token 156. The SMS message need not contain any data in its body since the phone number of the sending mobile phone is automatically sent along with the message. The user token server 116 preferably identifies the user's mobile phone 106 based upon the phone number with which the SMS message is tagged. In an alternative embodiment, the user 108 makes a phone call with his personal communication device 106 to the communication module 118. The user token server 116 identifies the user's personal communication device 106 preferably based upon a caller ID feature. Alternatively, the user 108 may call from any phone and enter in the phone number of his personal communication device 106. As another alternative, the user 108 may request the token 156 through the secure system 110 itself as illustrated in FIGS. 2C–D. As another alternative, the step 302 may be omitted altogether. In this case, the user token server 116 can automatically send tokens 156 to the user 108 at predetermined intervals, such as once per day where the tokens have a lifespan of one day.

At a step 304 the user token server 116 generates a token 156. The token 156 may be generated by any of a number of methods that preferably produces a random or pseudo-random sequence of numbers and/or digits. The token 156 is preferably long enough such that it cannot be guessed, but short enough such that it is relatively easy to enter, such as six to eight characters.

At a step 306, the token server 116 generates a new password 158. The token server 116 preferably creates the new password 158 by combining the user's passcode 154, which is stored by the user token server 116, with the newly generated token 156. At a step 308, the token server updates the user database 114 with the new password 158. In the case that the user's account in the user database 114 is inactive or deactivated, the token server 116 activates the user's account.

In the preferred embodiment, the token server creates a hash of the password 158 and stores the hash of the password 158 in the user database 114 rather than storing the password 158 itself. The hash is typically performed using a one-way hashing algorithm where the same password always produces the same hash, but where the password cannot be determined from the hash. In typical systems, passwords 158 are stored as hashes rather than as plain text in order to prevent system administrators and others from being able to determine users' passwords by examining the user database 114. Also, when a user 108 submits a password 158 upon login to a secure system 110, the submitted password 158 is immediately hashed using the same one-way hashing algorithm before transmission to the authentication module 112. The authentication module 112 then compares hashes of passwords rather than the passwords themselves to authenticate the user 108. In this manner, passwords 158 need not be transmitted over any communication links or computer networks as clear text. It will be apparent to one skilled in the art that the present invention can be implemented with or without the hashing of passwords and that incorporating hashing of passwords does not substantively affect the scope or spirit of the invention. So as not to unnecessarily obscure aspects of the present invention, a password as referred to herein may be an unhashed or a hashed password. For example, a receipt of a password may be a receipt of an unhashed or hashed password, and a comparison of passwords may be a comparison of unhashed or hashed passwords.

At a step 310, the token server 116 transmits the token 156 to the user's personal communication device 106 via the token delivery communication link 105. In the preferred embodiment, the communication module 118 is a mobile phone, and the user token server 116 uses the SMS send capability of the phone 118 to send an SMS message including the token 156 to the user's personal communication module 106. At a step 312, the user 108 receives the token through his personal communication device 106.

At a step 314, the user 108 logs into the secure system 110 using the user ID 152 and the password 158. In the preferred embodiment, the user 108 combines the passcode 154 and the token 156 by concatenation to form the password 158. In an alternative embodiment, the passcode 154 and the token 156 are submitted separately.

At a step 316, the secure system 110 transmits login data 159 to the user authentication server 102 over the computer network 103 for authentication of the user 108. The login data 159 preferably includes the user ID 152 and a hash of the password 158 that the secure system 110 creates in order to avoid sending the password 158 over the computer network 103 in clear text. Alternatively, the login data 159 may include a hash of the passcode 154 and the token 156. As another alternative, the password 158, or the passcode 154 and token 156 are not hashed.

At a step 318, the user authentication server 102 authenticates the user 108 based upon the login data 159. In order to authenticate the user 108, the authentication server 102 preferably compares the login data to the password 158 (hashed or unhashed) or the passcode 154 and token 156 (hashed or unhashed) corresponding to the user ID 152 stored in the user database 114.

At a step 320, the user authentication server 102 transmits an authentication confirmation 162 to the secure system 110. At a step 322, the secure system 110 allows the user 108 access based upon the authentication confirmation 162.

II. The User Token Server

Figure 4:
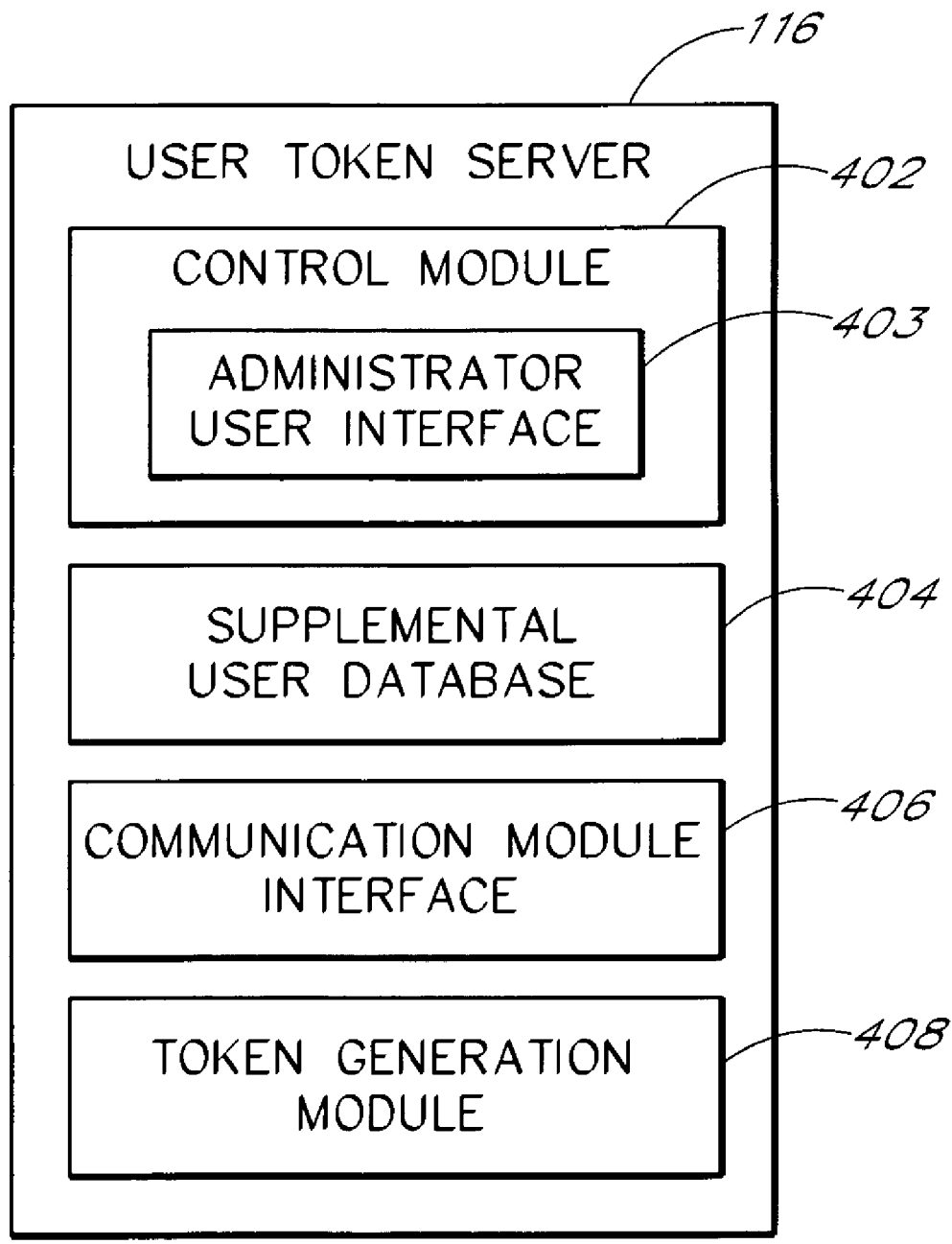
FIG. 4 illustrates a preferred embodiment of a user token server.

FIG. 4 illustrates a preferred embodiment of the user token server 116. The user token server 116 preferably includes a process or program running on or in conjunction with the user authentication server 102. The user token server 116 may, however, include a computer upon which the process or program executes. The user token server 116 preferably includes a control module 402, a supplemental user database 404, a communication module interface 406, and a token generation module 408. The various modules and components of the user token server 116 are described herein from a functional perspective. The various functional components may, however, be seamlessly integrated into one or more executable programs, data structures, and/or physical components.

The control module 402 preferably serves as the top level component of the user token server 116. The control module 402 preferably handles any tasks or functions not handled by the other modules of the token server 116, in addition to controlling the other modules. The control module 402 preferably maintains a supplemental user database 404, which preferably stores associations of user IDs with passcodes, phone numbers of users' personal communication devices, and any other supplemental user data. The other supplemental user data may include one or more of: whether an account is active, the expiration time of passwords, and the frequency with which tokens may be automatically distributed. The supplemental user database 404 is preferably accessed and modified through an administrator user interface 403 provided by the control module 402. The administrator user interface 403 allows administration of user privileges by adding, modifying and removing user IDs, passcodes, and phone numbers from the supplemental user database 404.

In the preferred embodiment, the supplemental user database 404 is maintained separately from the user database 114 of the user authentication server 102. In this configuration, the user database 114 supplied with an OEM system need not be modified or reconfigured. The user token server 116 can be added to existing secure systems in order to provide additional security functionality. In an alternative embodiment, the supplemental user database 404 may be integrated into the user database 114. In this case, user authentication module 102 is preferably configured and supplied as a single integrated component.

Figure 5:
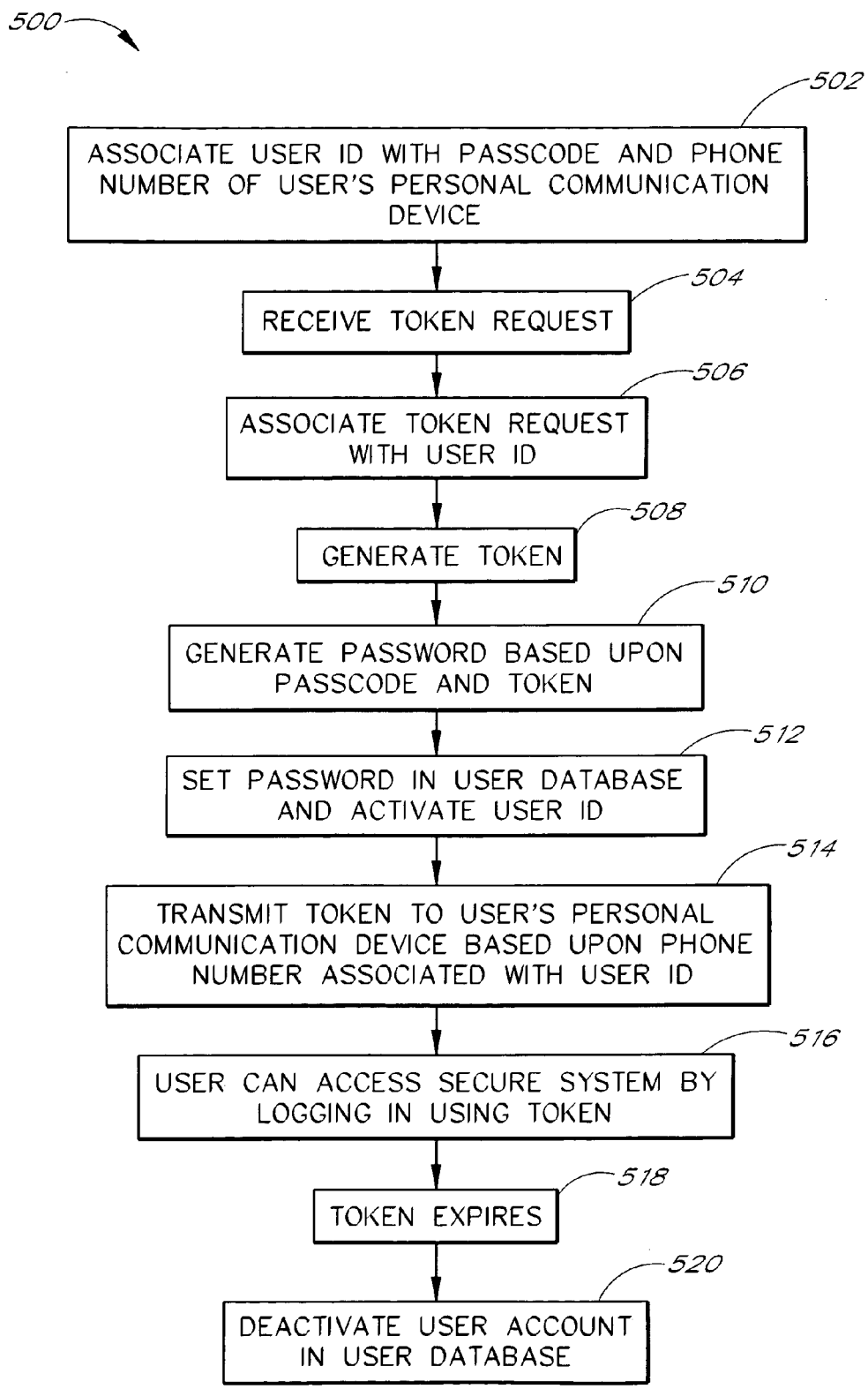
FIG. 5 illustrates a preferred process by which the user token server provides tokens and administrates user accounts.

FIG. 5 illustrates a preferred process 500 by which the user token server 116 provides tokens 156 and administers user accounts. The process 500 is described below in conjunction with the description of the functionality of the various modules and components of the user token server 116.

At a step 502, the control module 402 associates a user ID with a passcode 154 and a phone number of a user's personal communication device 106. Upon initially setting up an account, the association can be performed manually by a system administrator through the administrator user interface 403. The administrator user interface 403 preferably solicits a desired user ID 152, passcode 154, and phone number from a system administrator. The control module 402 then preferably creates a deactivated user account with a user ID 152 for the secure system 110 on the user database 114 of the user authentication server 102. The control module 402 preferably accesses the user database 114 using an application program interface (API) (not illustrated), which is typically provided with OEM systems. The control module 402 also preferably creates an entry in the supplemental user database 404 including the user ID 152, the passcode 154, and the phone number.

At a step 504, the user token server 116 receives a token request 160 from the user 108, possibly in order to activate his deactivated account. The token request 160 is preferably received through the communication module 118, which the control module 402 preferably controls through a communication module interface 406. The communication module interface 406 is preferably a device driver tailored for the specific implementation of the communication module 118. In alternative embodiments, the user may request the token 156 through the secure system 110 itself, as illustrated in FIGS. 2C–D. In this case, the request 160 may be received through the computer network 103.

At a step 506, the control module 402 associates the token request 160 with a valid user ID 152. The control module 402 may make this association based upon a supplied phone number by querying the supplemental user database 404. In one embodiment, if the user ID 152 is supplied in conjunction with the request 160, the step 506 is not performed.

At a step 508, the token generation module 408 generates a token by a method that produces a random or pseudo-random sequence of numbers or digits or both numbers and digits. Many methods are presently known for producing such random sequences. The token generation module 408 preferably passes the newly generated token 156 to the control module 402.

At a step 510, the control module 402 generates a new password 158 based upon the generated token 156 and the passcode 154 associated with the user ID 152 as listed in the supplemental user database 404. The new password 158 is preferably generated by concatenating the passcode 154 and the token 156.

At a step 512, the control module 402 sets or resets the password associated with the user ID 152 in the user database 114. In the preferred embodiment, the control module 402 sets the password to be a one-way hash of the newly generated password 158. In alternative embodiments, the password 158 need not be hashed. In the case the user's account has been deactivated, the control module 402 activates the user ID 152 in the user database 114. The control module 402 preferably accesses the user database 114 through the database API (not illustrated).

At a step 514, the control module 402 transmits the token 156 to the user's personal communication device 106 preferably based upon the phone number associated with the user ID 152 in the supplemental user database 404. In the preferred embodiment, the control module 402 causes the communication module 118 to generate and send an SMS message containing the token 156 to the user's mobile phone. In an alternative embodiment, the communication module 118 may call the phone number of the user's pager and transmit the token 156 as the page data.

At a step 516, the user 108 is able to access the secure system 110 by logging in using the supplied token 156. The user 108 preferably concatenates his memorized secret passcode 154 with the valid token 156 to create the password 158. The user then logs in using his user ID 152 and the password 158.

At a step 518, if the token has an expiry time, the token 156 expires. At a step 520, upon expiration of the token 156, the control module 402 deactivates the user account in the user database 114.

Finally, the process 500 repetitively continues either from the step 502, if a new user 108 is to be added, or from the step 504 if an existing user 108 requests a token 156.

III. Token Delivery and Request Communication Links

Figure 6A:
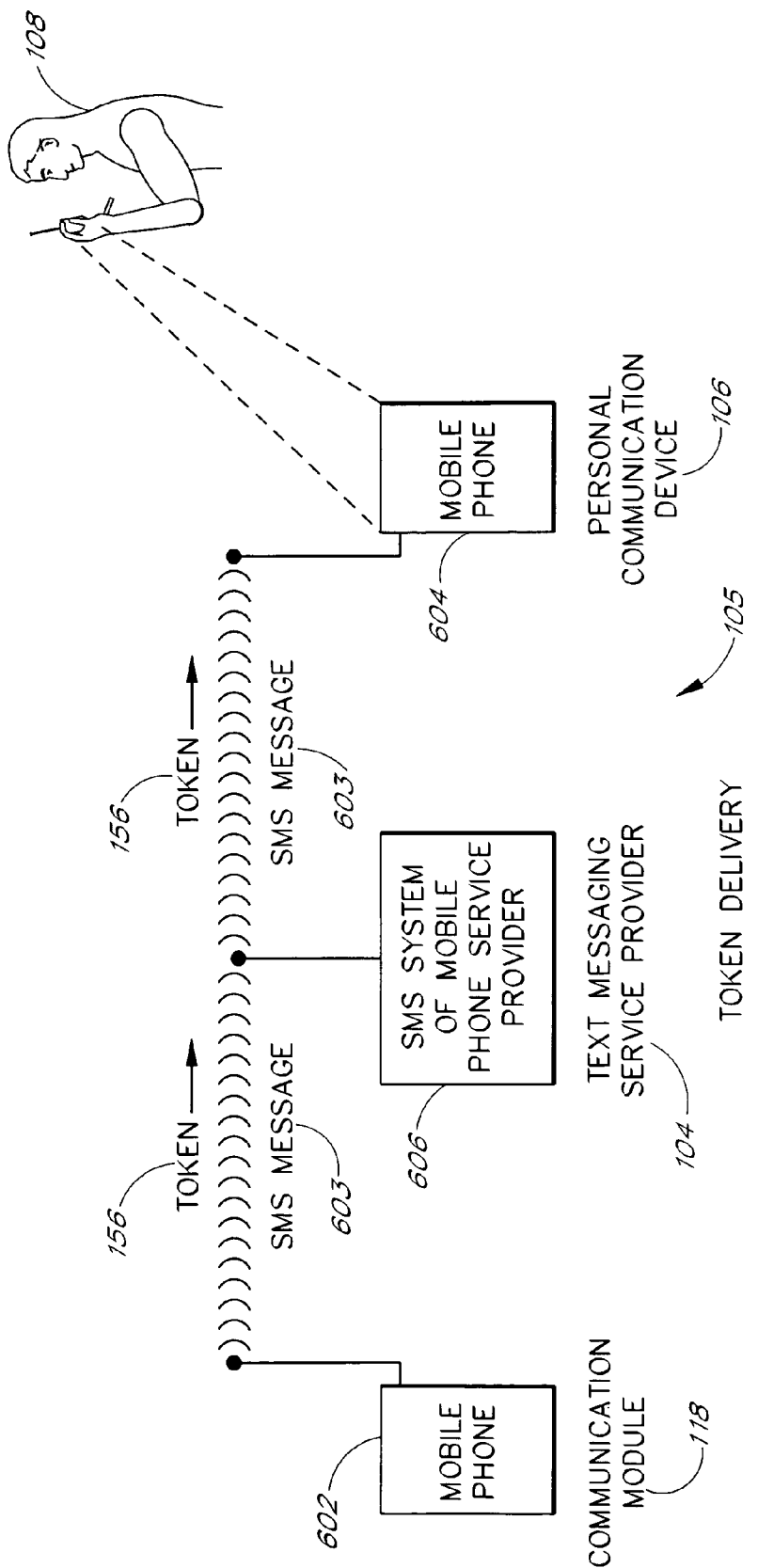
Figure 6C:
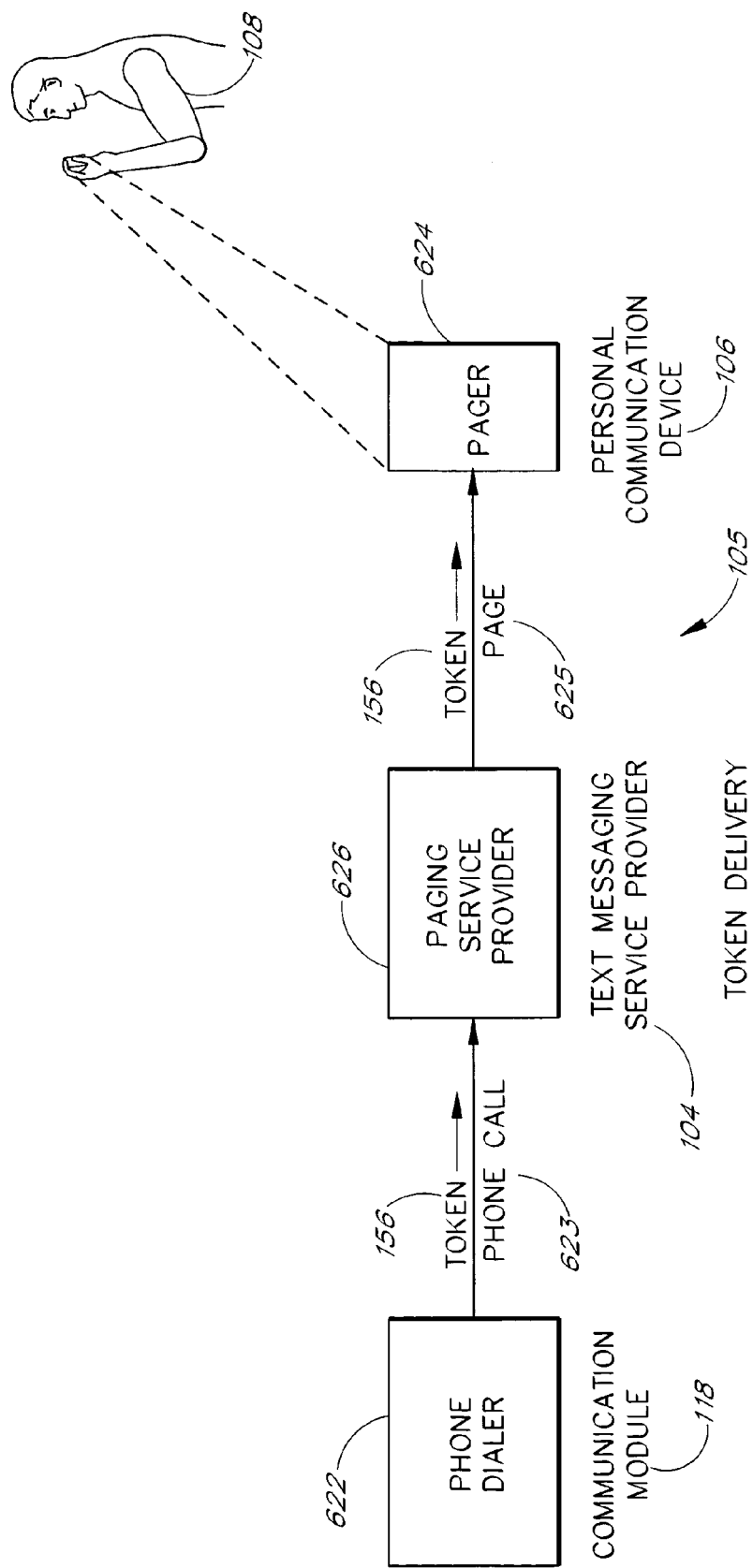
Figure 7B:
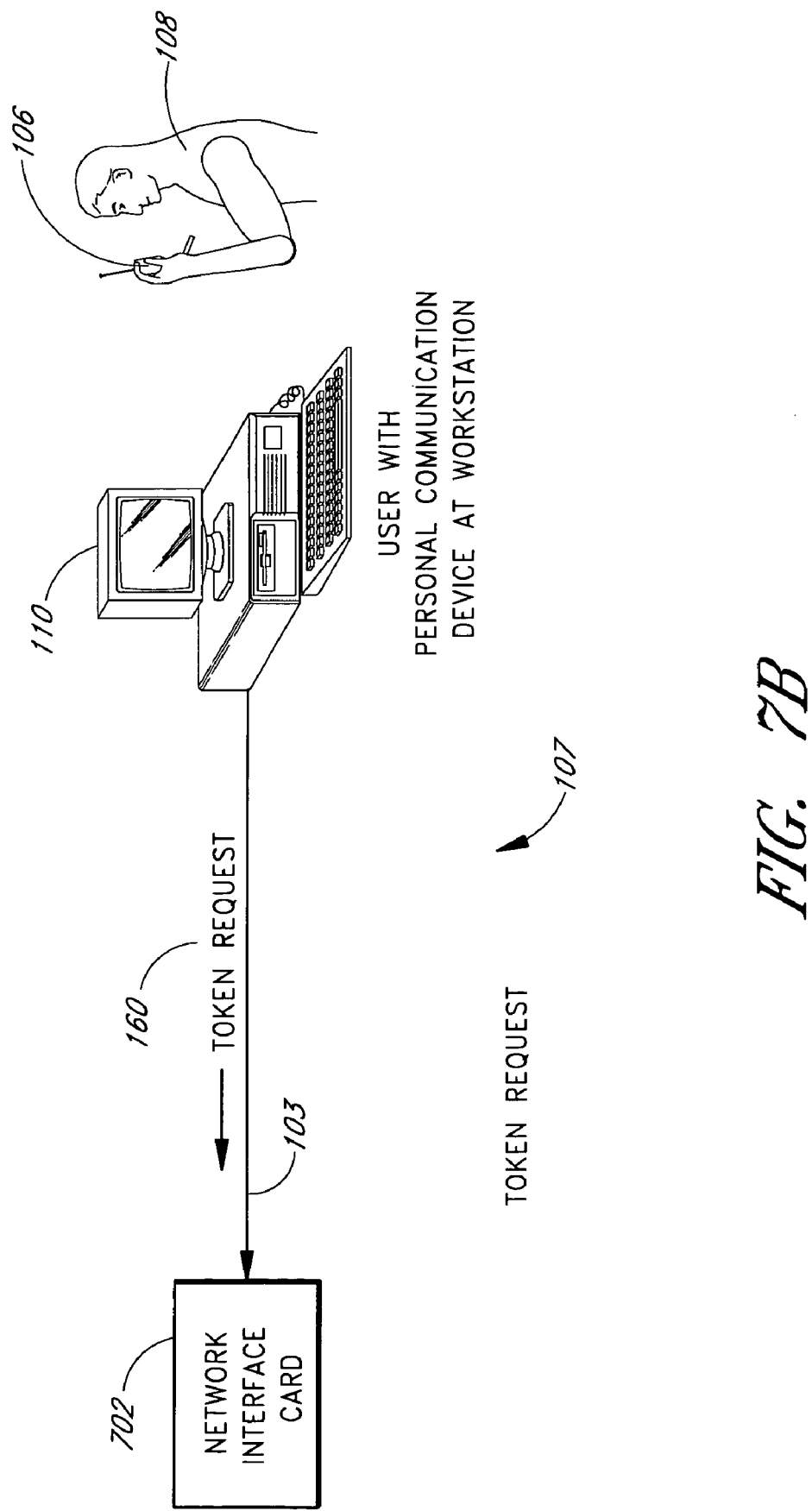

FIGS. 6A–C illustrate three embodiments of the token delivery communication link 105. FIGS. 7A–B illustrate two embodiments of the token request communication link 107. In some embodiments, the same communication link may be used as the token delivery communication link 105 and the token request communication link 107. FIG. 8 illustrates an embodiment of a combined token request and delivery communication link that can function in conjunction with a mobile phone without text messaging capability. Additionally, communication technologies other than those illustrated here by example may be used to implement the communication links 105 and 107.

FIG. 6A illustrates a preferred embodiment of the token delivery communication link 105. The communication module 118 is a mobile phone 602 with SMS send capability. The mobile phone 602 sends an SMS message 603 including the token 156 to the user's mobile phone 604. While in transit, the message 603 is received and retransmitted by the SMS system 606 of a mobile phone service provider.

FIG. 6B illustrates a first alternative embodiment of the token delivery communication link 105. In this case, the communication module 118 is an ISDN card or an X.25 connection card 612 that connects to an SMS gateway 616 of a mobile phone service provider via an ISDN or X.25 connection 613. The card 612 transmits the token 156 to the SMS gateway 616, which then creates an SMS message 615 and transmits the message 615 to the user's mobile phone 614.

FIG. 6C illustrates a second alternative embodiment of the token delivery communication link 105. In this case, the communication module 118 is a phone dialer 622, the personal communication device 106 is a pager 624, and the text messaging service provider is a paging service 626. In order to transmit a token 156, the phone dialer 622 places a phone call 623 to the phone number of the user's pager 624. The paging service provider 626 answers and the phone dialer 622 enters a numeric token 156 to be transmitted to the pager 624. The paging service provider 626, in turn, sends a page 625 containing the token 156 to the user's pager 624.

FIG. 7A illustrates a preferred embodiment of the token request communication link 107. The personal communication device 106 is preferably the mobile phone 604, the communication module 118 is preferably the mobile phone 602, and the text messaging service provider 104 is preferably the SMS system 606 of the preferred embodiment of the token delivery communication link 105 (FIG. 6A). Alternatively, the communication module 118 may be the ISDN card or X.25 connection card 612 connected through the ISDN or X.25 connection 613 as in the first alternative embodiment of the token delivery communication link 105 (FIG. 6B). The mobile phone 604 preferably sends an SMS message 703 as a token request 160 to the mobile phone 602 or the ISDN card 612. The SMS message 703 may have a blank message body but the message preferably includes the sending phone's phone number in a tag or header field. While in transit, the message 603 is received and retransmitted by the SMS system 606. The user token server 116 preferably identifies the sending phone's phone number, and if the phone number matches a valid user ID 152, the token server 116 processes the message 703 as a token request 160.

FIG. 7B illustrates a first alternative embodiment of the token request communication link 107 in accordance with the token request and login screens of FIGS. 2C–D. The user 108 makes the token request 160 through a first login screen (FIG. 2C) on the secure system 110. The token request 160 in this case preferably includes the user's user ID 152 and is preferably transmitted through the computer network 103 to the user token server 116 through a network interface card 702. In this case, the token request 160 need not be communicated through the communication module 118. Also, the personal communication device 106 need not be used in requesting the token 156 but is preferably used in delivering the token 156.

FIG. 8 illustrates a combined token request and delivery link in which the personal communication device 106 is preferably a mobile phone. The communication module 118 is preferably an automated telephone response system 802 with a caller ID capability. The user 108 places a phone call 803 to the telephone response system 802, which identifies the calling phone 804 using caller ID. The telephone response system 802 interprets the call as a token request 160 and responds by generating a voice synthesized recitation of the token 156 that the user hears through the mobile phone 804. The mobile phone 804, in this case, need not have any text messaging or SMS capability.

In still other embodiments, various other technologies and combinations of technologies, which will be apparent to one skilled in the art, can be used to implement the token delivery 105 and token request 107 communication links. For example, a token request may be made through a land line phone, and in response, a token may be delivered to a mobile phone.

IV. Conclusion

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow. In the claims, a portion shall include greater than none and up to the whole of a thing; encryption of a thing shall include encryption of a portion of the thing; a password may be an unhashed or a hashed password. In the method claims, reference characters are used for convenience of description only, and do not indicate a particular order for performing the method.

What is claimed is:

1. A method of authenticating a user on a first secure computer network, the user having a user account on said first secure computer network, the method comprising:

associating the user with a personal communication device possessed by the user, said personal communication device in communication over a second network, wherein said second network is a cell phone network different from the first secure computer network;

receiving a request from the user for a token via the personal communication device, over the second network;

generating a new password for said first secure computer network based at least upon the token and a passcode, wherein the token is not known to the user and wherein the passcode is known to the user;

setting a password associated with the user to be the new password;

activating access the user account on the first secure computer network;

transmitting the token to the personal communication device;

receiving the password from the user via the first secure computer network; and deactivating access to the user account on the first secure computer network within a predetermined amount of time after said activating, such that said user account is not accessible through any password, via said first secure computer network.

2. The method of claim 1, wherein the new password is generated by concatenating the token and the passcode.

3. The method of claim 1, wherein the personal communication device is a mobile phone.

4. The method of claim 1, wherein the personal communication device is a pager.

5. A user authentication system comprising:

a computer processor;

a user database configured to associate a user with a personal communication device possessed by the user, said personal communication device configured to communicate over a cell phone network with the user authentication system;

a control module executed on the computer processor configured to create a new password based at least upon a token and a passcode, wherein the token is not known to the user and wherein the passcode is known to the user, the control module further configured to set a password associated with the user to be the new password;

a communication module configured to transmit the token to the personal communication device through the cell phone network; and an authentication module configured to receive the password from the user through a secure computer network, said secure computer network being different from the cell phone network, wherein the user has an account on the secure computer network, wherein the authentication module activates access to the account in response to the password and deactivates the account within a predetermined amount of time after activating the account, such that said account is not accessible through any password via the secure computer network.

6. The system of claim 5, wherein the communication module is further configured to receive a request from the user for the token, and wherein the control module is further configured to create the new password in response to the request.

7. The system of claim 6, wherein the request is transmitted by the user through the personal communication device.

* * * * *

UNITED STATES PATENT AND TRADEMARK OFFICE
CERTIFICATE OF CORRECTION

PATENT NO. : 6,993,658 B1  Page 1 of 1
APPLICATION NO. : 09/519829
DATED : January 31, 2006
INVENTOR(S) : Engberg et al.

It is certified that error appears in the above-identified patent and that said Letters Patent is hereby corrected as shown below:

On Title Page

Item 56 Sheet 1 of 1 List of References cited by applicant and considered by examiner, Entry 1, line 1 (Other Documents), Page 2, Column 1 (Other Publications), delete "computerterps" and insert -- computerps --.

Item 56 Sheet 1 of List of References cited by applicant and considered by examiner, Entry 1, line 1 (Other Documents), Page 2, Column 1 (Other Publications), delete "html," and insert -- html.--

Item 56 Sheet 1 of List of References cited by applicant and considered by examiner, Entry 3, line 1 (Other Documents), Page 2, Column 2 (Other Publications), delete "Authenication" and insert -- Authentication --.

Signed and Sealed this

Third Day of April, 2007

JON W. DUDAS
*Director of the United States Patent and Trademark Office*